(12) United States Patent
Prociw et al.

(10) Patent No.: US 9,457,370 B2
(45) Date of Patent: Oct. 4, 2016

(54) QUICK DISCONNECT DEVICES FOR SPRAY NOZZLES

(71) Applicants: Delavan Inc, West Des Moines, IA (US); Delavan Limited, Widnes, Cheshire (GB)

(72) Inventors: Lev A. Prociw, Johnston, IA (US); Frank Whittaker, Cheshire (GB); Neil Smith, Wigan (GB)

(73) Assignees: Delavan Inc, West Des Moines, IA (US); Delavan Limited, Cheshire (GB)

( * ) Notice: Subject to any disclaimer, the term of this patent is extended or adjusted under 35 U.S.C. 154(b) by 240 days.

(21) Appl. No.: 14/178,752

(22) Filed: Feb. 12, 2014

(65) Prior Publication Data
US 2015/0060578 A1    Mar. 5, 2015

Related U.S. Application Data

(60) Provisional application No. 61/870,599, filed on Aug. 27, 2013.

(51) Int. Cl.
| | |
|---|---|
| *B05B 15/06* | (2006.01) |
| *F16L 37/098* | (2006.01) |
| *F16L 37/133* | (2006.01) |
| *F16L 37/138* | (2006.01) |
| *B05B 1/34* | (2006.01) |

(52) U.S. Cl.
CPC .......... *B05B 15/065* (2013.01); *F16L 37/0982* (2013.01); *F16L 37/0985* (2013.01); *F16L 37/133* (2013.01); *F16L 37/138* (2013.01); *B05B 1/3447* (2013.01)

(58) Field of Classification Search
CPC ..... F16L 37/24; F16L 37/244; F16L 37/252; F16L 37/08; F16L 37/12; F16L 37/133; F16L 37/138; F16L 37/084; F16L 37/098; F16L 37/0982; F16L 37/0985; B05B 1/16; B05B 1/3405; B05B 1/341; B05B 1/3421; B05B 1/3431; B05B 1/3447; B05B 15/06; B05B 15/065
USPC ............... 239/390, 391, 397, 438, 442, 600; 285/33, 81, 82, 84
See application file for complete search history.

(56) References Cited

U.S. PATENT DOCUMENTS

| | | | | |
|---|---|---|---|---|
| 2,675,829 A | * | 4/1954 | Livers ................... | F16L 37/133 137/614.06 |
| 2,705,159 A | * | 3/1955 | Pfau ....................... | F16L 37/23 137/614.03 |
| 3,628,812 A | * | 12/1971 | Larralde ............... | F16L 37/133 285/24 |
| 3,680,793 A | | 8/1972 | Tate et al. | |
| 6,983,959 B2 | | 1/2006 | Wolf et al. | |
| 7,611,079 B2 | | 11/2009 | Whittaker et al. | |

* cited by examiner

*Primary Examiner* — Christopher Kim
(74) *Attorney, Agent, or Firm* — Locke Lord LLP; Scott D. Wofsy; Joshua L. Jones (57) ABSTRACT

A nozzle assembly includes a nozzle body defining an inlet and an opposed spray outlet for producing a spray of fluid supplied at the inlet. The nozzle body includes a radially outward extending retainer feature. An adapter having an adapter bore therethrough is provided for supplying fluid to the inlet of the nozzle body. The nozzle body is engaged within the bore of the adapter. A retainer radially outward of the adapter and nozzle body includes a retainer feature engaged to the retainer feature of the nozzle body to hold the nozzle body and adapter body together. A sleeve is engaged to the retainer radially outward thereof to prevent disengagement of the retainer features of the nozzle body and retainer. The sleeve and retainer are configured for relative movement for releasing the retainer features of the nozzle body and retainer for removal of the nozzle body from the adapter.

5 Claims, 11 Drawing Sheets

QUICK DISCONNECT DEVICES FOR SPRAY NOZZLES

CROSS-REFERENCE TO RELATED APPLICATIONS

This application claims the benefit of priority to U.S. Provisional Patent Application No. 61/870,599 filed Aug. 27, 2013 which is incorporated by reference herein in its entirety.

BACKGROUND OF THE INVENTION

1. Field of the Invention

The present disclosure relates to spray nozzles, and more particularly to spray nozzles for use in spray drying applications.

2. Description of Related Art

Fluid nozzles or atomizers having a spiral swirl chamber and a spray orifice disposed within a nozzle body have been employed in the past for various applications, including spray drying, aeration, cooling, and fuel injection. U.S. Pat. No. 3,680,793 to Tate, which is herein incorporated by reference in its entirety, discloses a spray nozzle that includes a swirl chamber configured such that the origin of the spiral flow in the swirl chamber and the spray orifice formed in the orifice disc are eccentrically offset relative to each other. The spray orifice and the spiral flow origin were eccentrically offset from each other so as to improve the spray patternation in both large and small spray nozzle applications.

Spray drying is the transformation of a feed liquid from a fluid state into dried particulate form by spraying atomized feed into a gaseous drying medium. The liquid feed can be either a solution, suspension, dispersion, emulsion or slip. Often, the liquid feed contains abrasive solids. The atomization of the feed is accomplished by a spray nozzle. The nozzle must disperse the liquid into small droplets, which should be well distributed into the air stream and also serve as the metering device for the feed system.

In applications such as spray drying, the energy for atomization is supplied solely by the liquid feed pressure with inlet pressures typically exceeding 5,000 psi and occasionally reaching 10,000 psi. Due to the high inlet pressure, the liquid feed passes through the flow passages of the spray nozzle at a high velocity. Liquid feed containing abrasive solids and traveling at a high flow velocity causes erosion of the flow passages in the swirl chamber and orifice disc. As a result, the swirl chamber and orifice disc need to be replaced somewhat routinely.

In most nozzles, replacement of the internal components first requires the removal of the nozzle assembly from the fluid delivery system. Then an adapter which is normally threadably secured to the nozzle body must be disengaged. The adapter functions to secure the internal components, namely the swirl chamber, orifice disc and O-ring seals (adapter and orifice), within the nozzle body. The adapter also facilitates the axial alignment of the swirl chamber by providing a recess for the swirl chamber in its downstream end. Next an adapter seal, which is disposed between the adapter and the swirl chamber is removed. At this point, the remainder of the internal components can be freely removed.

Reassembling the spray nozzle is accomplished by reversing the disassembly procedure. However, difficulty is often encountered when attempting to engage the nozzle body, including the orifice disc and associated O-ring, with the adapter. Generally, the adapter is placed on a flat surface and the orifice disc is placed on top within the alignment recess. The nozzle body with orifice disc disposed therein is also placed on a flat surface with the discharge orifice facing down. In order to assemble the nozzle, either the adapter or the nozzle body have to be inverted. However, when inverting either the nozzle body or the adapter to engage the parts, the internal components unseat, become misaligned and often fall out.

The location of nozzles in a facility is often not easily reached by maintenance personnel responsible for servicing the nozzles. Typically, a spray dry nozzle, for example, is located on a spray lance connected to a branch of a flange assembly. When a nozzle requires maintenance or the like, the lance can be removed and the maintenance work is conducted on a work bench, for example. The time required to remove an individual nozzle can add up, particularly where many nozzles are in use and where each nozzle must be frequently removed.

Some solutions to these problems have been presented. For example, U.S. Pat. No. 7,611,079 to Whittaker et al., which is incorporated by reference herein in its entirety presents ways of facilitating replacement of components in spray nozzles.

While conventional methods and systems have generally been considered satisfactory for their intended purpose, there is an ongoing need in the art for systems and methods that facilitate nozzle removal, replacement, and maintenance. There also remains a need in the art for such systems and methods that are easy to make and use. The present disclosure provides a solution for these problems.

SUMMARY OF THE INVENTION

A nozzle assembly includes a nozzle body defining an inlet and an opposed spray outlet for producing a spray of fluid supplied at the inlet. The nozzle body includes a radially outward extending retainer feature. An adapter having an adapter bore therethrough is provided for supplying fluid to the inlet of the nozzle body. The nozzle body is engaged in fluid communication with the bore of the adapter. A retainer radially outward of the adapter and nozzle body includes a retainer feature engaged to the retainer feature of the nozzle body to hold the nozzle body and adapter together. A sleeve is engaged to the retainer radially outward thereof to prevent disengagement of the retainer features of the nozzle body and retainer. The sleeve and retainer are configured for relative movement for releasing the retainer features of the nozzle body and retainer for removal of the nozzle body from the adapter.

It is contemplated that the retainer can include an annular retainer base. The retainer feature of the retainer can include an annular structure having a plurality of circumferentially spaced retainer segments, each retainer segment being connected to the retainer base by a flexible retainer finger for allowing flexure of the retainer for radial expansion of the retainer feature of the retainer. Each flexible retainer finger can be radially biased toward a retainer position corresponding to an unreleased position of the sleeve and retainer.

In certain embodiments, the sleeve is configured for movement between a first position in which the sleeve is engaged outboard of the retainer feature of the retainer to prevent disengagement of the retainer features of the nozzle body and retainer, and a second position in which the sleeve is axially retracted from the retainer feature of the retainer to allow disengagement of the retainer features of the nozzle body and retainer for removal of the nozzle body from the adapter. The adapter can include a retainer feature engaged with the retainer feature of the nozzle body, and wherein in the first position of the sleeve, the retainer feature of the retainer captures the retainer features of the nozzle body and adapter to prevent disengagement of the nozzle body.

The retainer feature of the adapter can extend radially outward, and the retainer features of the nozzle body and adapter can abut one another when engaged with the sleeve in the first position. The retainer feature of the adapter can extend radially outward beyond the retainer feature of the nozzle body. The retainer features of the nozzle body and adapter can abut one another at an interface that is oblique with respect a longitudinal axis defined by the nozzle body. The retainer feature of the retainer can define a pocket on a radially inward portion thereof, wherein the pocket is configured and adapted for mating engagement with the radially outward extending, abutting retainer features of the adapter and nozzle body. A groove can be defined on an outlet portion of the nozzle body for gripping of the nozzle body for removal of the nozzle body from the adapter. The sleeve can include a locking feature configured to lock the sleeve in the first position by twisting the sleeve about a longitudinal axis defined by the nozzle body. A sleeve spring can be engaged to the sleeve to bias the sleeve toward the first position.

In accordance with certain embodiments, the sleeve is fixed to the adapter and defines a sleeve bore having a narrow downstream portion for locking the retainer features of the nozzle body and retainer together and a wider upstream portion, wherein the retainer is configured for movement between a first position in which the narrow downstream portion of the sleeve is engaged outboard of the retainer feature of the retainer to prevent disengagement of the retainer features of the nozzle body and retainer, and a second position in which the retainer is axially retracted relative to the sleeve and radially expanded into the wider upstream portion of the sleeve away from the retainer feature of the nozzle body to allow disengagement of the retainer features of the nozzle body and retainer for removal of the nozzle body from the adapter.

A release member can be engaged with the nozzle body between the nozzle body and the sleeve, wherein the release member includes a camming surface for urging the retainer radially outward in the second position. The release member and nozzle body can have corresponding lock features configured to lock the release member in a release position relative to the nozzle body. The release member can include grip elements to facilitate gripping the release member for removal of the nozzle body from the adapter. The retainer feature of the retainer can include an abutment surface for abutting engagement with the retainer feature of the nozzle body in the first position. It is also contemplated that the retainer feature of the retainer can include an abutment surface for abutting against the narrow downstream portion of the sleeve for compression of the retainer feature of the retainer between the retainer features of the nozzle body and the sleeve in the first position.

In certain embodiments, a spring is mounted between the retainer and the adapter to bias the retainer axially toward the first position. A release member can be included outboard of the sleeve communicating through the sleeve to connect with the retainer for actuating the retainer between the first and second positions. Downstream portions of the sleeve and nozzle body can be sealingly engaged to seal the retainer from external debris.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
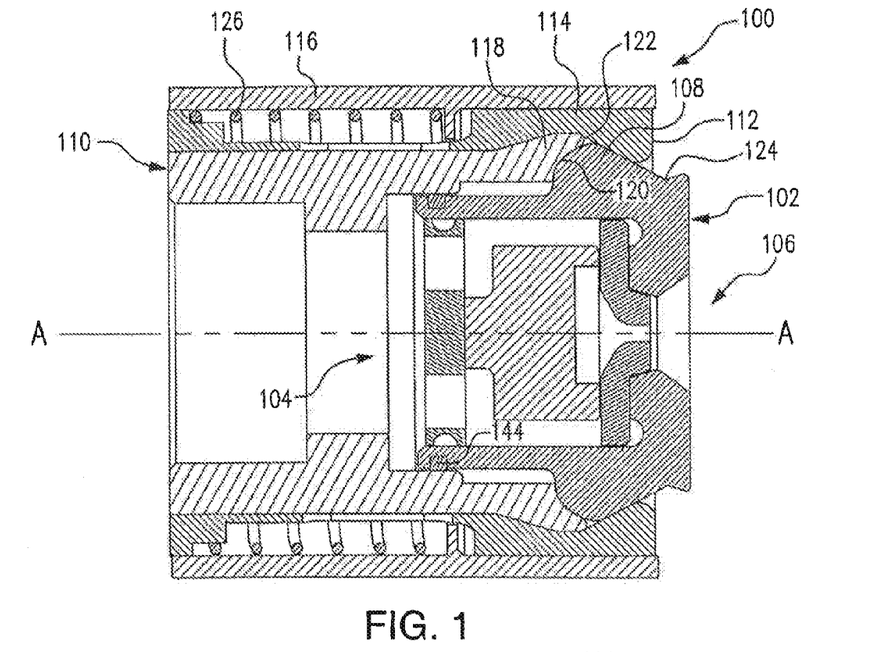
FIG. 1 is a cross-sectional side elevation view of an exemplary embodiment of a nozzle assembly constructed in accordance with the present disclosure, showing a spring loaded sleeve preventing release of a retainer holding the adapter and nozzle body together.

Reference will now be made to the drawings wherein like reference numerals identify similar structural features or aspects of the subject disclosure. For purposes of explanation and illustration, and not limitation, a partial view of an exemplary embodiment of a nozzle assembly in accordance with the disclosure is shown in FIG. 1 and is designated generally by reference character 100. Other embodiments of nozzle assemblies in accordance with the disclosure, or aspects thereof, are provided in FIGS. 2-10, as will be described. The systems and methods described herein can be used to facilitate removal, replacement, and maintenance of nozzle assemblies, such as in dry spray nozzle applications.

Nozzle assembly 100 includes a nozzle body 102 defining an inlet 104 and an opposed spray outlet 106 for producing a spray of fluid supplied at inlet 104. Nozzle body 102 includes a radially outward extending retainer feature, i.e. clasp feature 108. An adapter 110, e.g. for connecting a hose or other fluid conduit to nozzle assembly 100, having an adapter bore therethrough is provided for supplying fluid to inlet 104 of nozzle body 102. Nozzle body 102 is engaged in fluid communication with and within the bore of adapter 110. A retainer, i.e., clasp 112 radially outward of adapter 110 and nozzle body 102 includes a retainer feature, i.e., clasp feature 114, engaged to clasp feature 108 of nozzle body 102 to hold nozzle body 102 and adapter body 110 together. A sleeve 116 is engaged to clasp 112 radially outward thereof to prevent disengagement of clasp features 108 and 114 of nozzle body 102 and clasp 112. As indicated by the double pointed arrow in FIG. 1, sleeve 116 and clasp 112 are configured for relative movement for releasing clasp features 108 and 114 for removal of nozzle body 102 from adapter 110. Clasp feature 114 can expand radially outward as described in greater detail below with reference to FIG. 4.

Sleeve 116 is configured for movement between a first position, shown in FIG. 1, in which sleeve 116 is engaged outboard of clasp feature 114 of clasp 112 to prevent disengagement of the clasp features 108 and 114 as described above, and a second position, shown in FIG. 2, in which sleeve 116 is axially retracted from clasp feature 114 of clasp 112 to allow disengagement of clasp features 108 and 114 for removal of nozzle body 102 from adapter 110.

Adapter 110 includes a retainer feature, i.e., clasp feature 118, engaged with clasp feature 108 of nozzle body 102. In the first position of sleeve 116, shown in FIG. 1, clasp feature 114 of clasp 112 captures the clasp features 108 and 118 to prevent disengagement of nozzle body 102 from adapter 110. Clasp feature 118 of adapter 110 extends radially outward, and the clasp features 108 and 118 of nozzle body 102 and adapter 110 abut one another when engaged, e.g., when sleeve 116 is in the first position, as shown in FIG. 1. Clasp feature 118 extends radially outward beyond clasp feature 108. The clasp features 108 and 118 abut one another at an interface 120 that is oblique with respect longitudinal axis A defined by nozzle body 102. Clasp feature 114 of clasp 112 defines a pocket 122 on a radially inward portion thereof, wherein pocket 122 is configured and adapted for mating engagement with the radially outward extending, abutting clasp features 108 and 118.

A groove 124 is defined on an outlet portion of nozzle body 102 for gripping of nozzle body 102 for removal of nozzle body 102 from adapter 110. Sleeve 116 includes a locking feature, not shown in FIGS. 1-2, but see, e.g., the locking features described below with respect to FIG. 10, that is configured to lock sleeve 116 in the first position shown in FIG. 1 by twisting sleeve 116 about longitudinal axis A defined by nozzle body 102. A sleeve spring 126 is engaged to sleeve 116 and clasp 112 to bias sleeve 116 toward the first position shown in FIG. 1.

Figure 2:
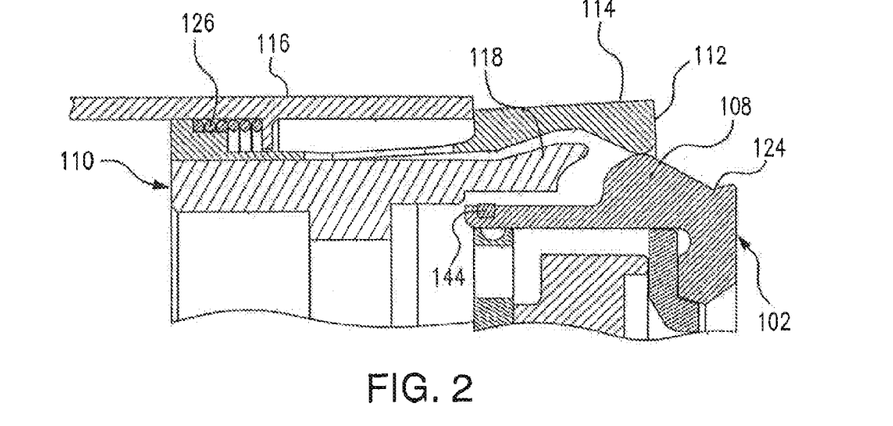
FIG. 2 is a cross-sectional side elevation view of the nozzle assembly of FIG. 1, showing the sleeve retracted for release of the nozzle body from the adapter.
Figure 3:
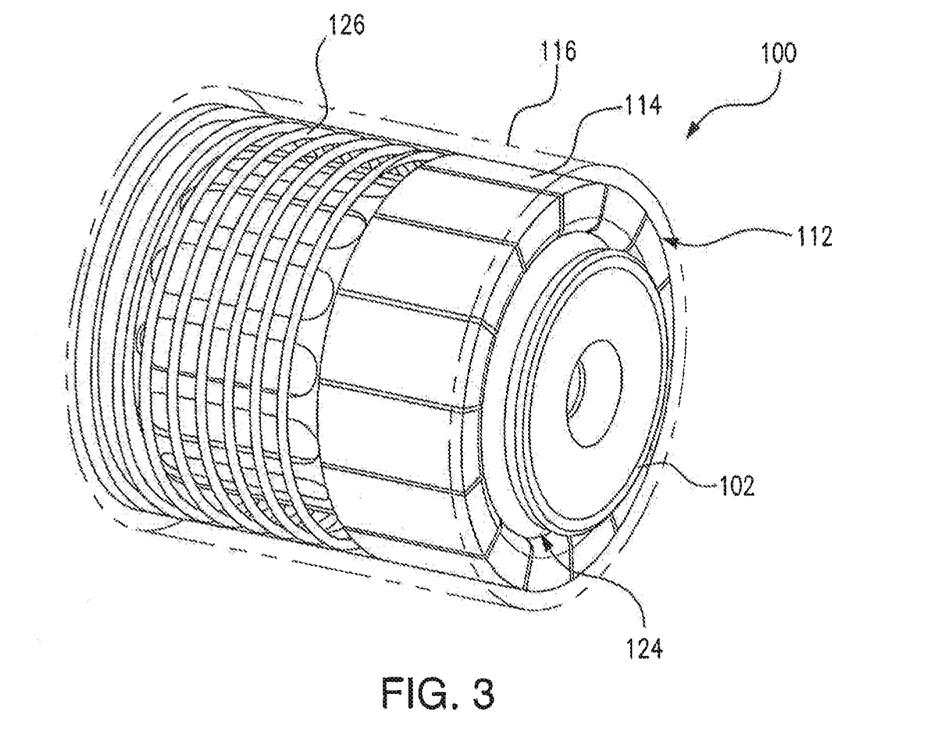
FIG. 3 is a perspective view of the nozzle assembly of FIG. 1, showing the assembly with the sleeve in phantom to show the retainer.

When sleeve 116 moves against the bias of spring 126 into the second position shown in FIG. 2, clasp feature 114 of clasp 112 is able to expand radially outward as needed to clear the clasp features 108 and 118 of nozzle body 102 and adapter 110. As shown in FIG. 3, the outlet end of nozzle body 102, including groove 124, protrudes beyond sleeve 116 and clasp 112. This, along with the bevels of clasp features 108, 118, and 114, allows for removal of nozzle body 102 from adapter 110 by pulling nozzle body 102 axially out of adapter 110, for example by gripping groove 124 manually or with a tool, and pulling.

Figure 4:
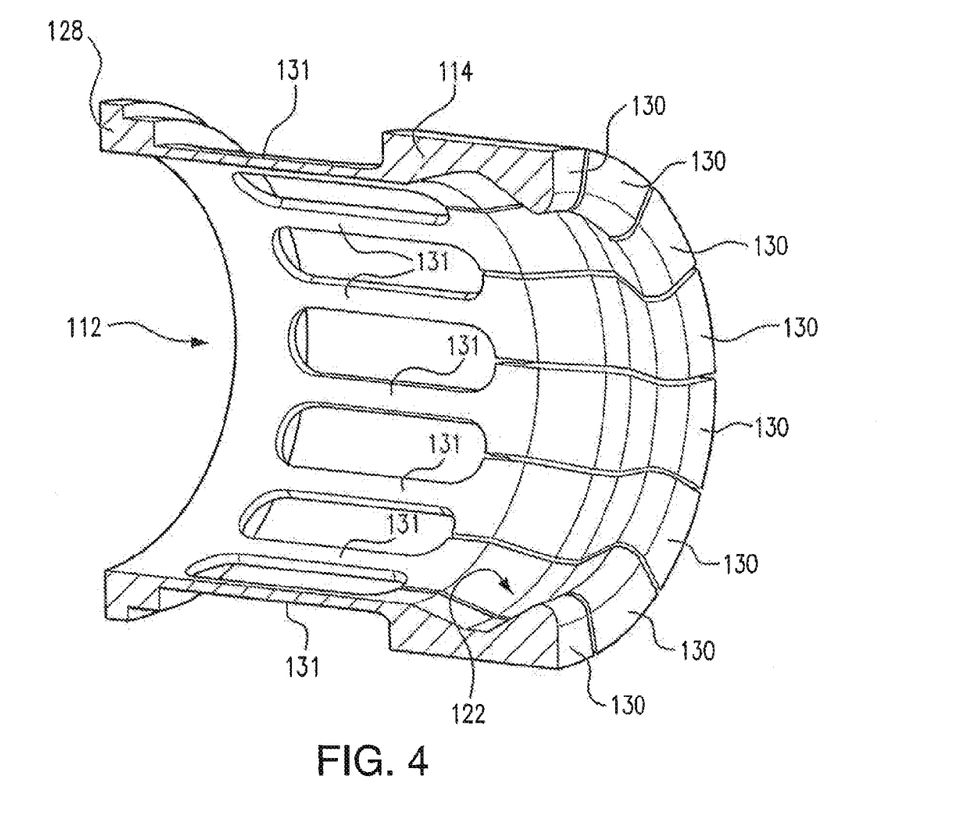
FIG. 4 is a cross-sectional perspective view of the retainer of FIG. 3, showing the flexible fingers between the retainer base and the segmented retainer feature.

Referring now to FIGS. 3-4, the mechanism for allowing radial expansion of clasp feature 114 of clasp 112 is explained. With sleeve 116 shown in phantom in FIG. 3, it can be seen that clasp feature 114 of clasp 112 is circumferentially segmented. In FIG. 4, it is shown that clasp 112 includes an annular retainer base, i.e., clasp base 128. Clasp feature 114 includes an annular structure having a plurality of circumferentially spaced retainer segments, i.e., clasp segments 130. Each clasp segment 130 is connected to clasp base 128 by a respective flexible retainer finger, i.e., clasp finger 130. This structure allows for flexure of clasp 112 for radial expansion of clasp feature 114. Each flexible clasp finger 130 is radially biased toward a clasp position corresponding to an unreleased position of sleeve 116 and clasp 112 as shown in FIG. 1. The apertures between adjacent fingers 131 define pill-shaped voids, however any other suitable shape can be used. The minimum thickness of clasp feature 114, at the apex of pocket 122 can be determined to handle the tensile stress thereon based on the operating pressure of nozzle assembly 100 as adapter 110 and nozzle body 102 are urged axially downstream against clasp 112 in operation. The thickness of fingers 131 can be determined by the spring stiffness needed. Clasp 112 can be made, for example, by machining from a bar of high strength metal spring material.

Figure 5:
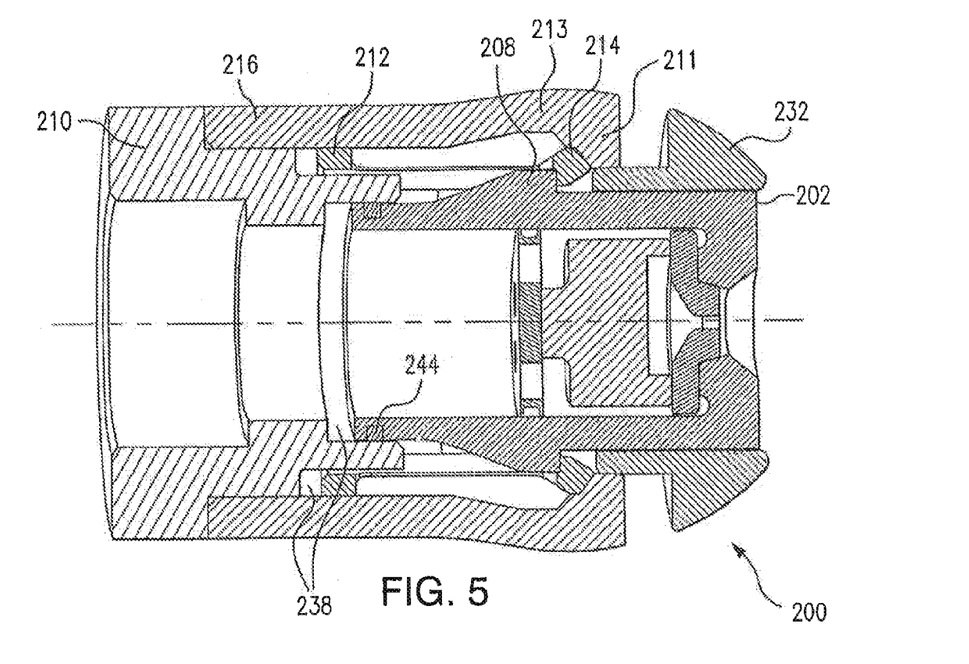
FIG. 5 is a cross-sectional perspective view of another exemplary embodiment of a nozzle assembly constructed in accordance with the present disclosure, showing a camming release member for expanding the retainer to clear the retainer feature of the nozzle body.
Figure 6:
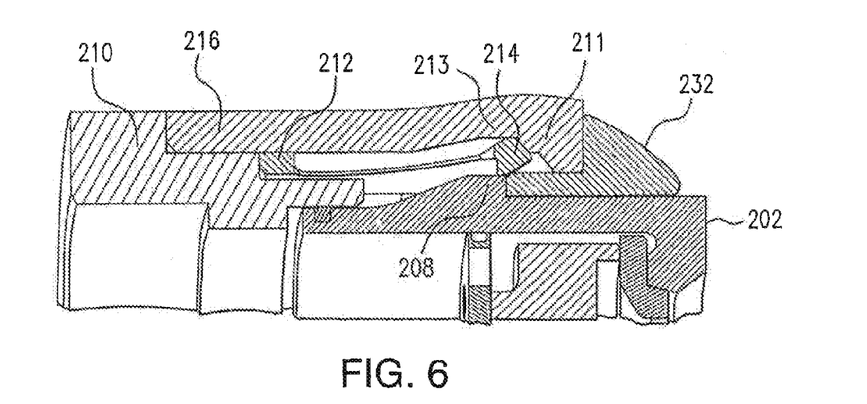
FIG. 6 is a cross-sectional perspective view of the nozzle assembly of FIG. 5, showing the release member expanding the retainer radially outward for removal of the nozzle body from the adapter.

With reference now to FIG. 5, another exemplary embodiment of a nozzle assembly, namely nozzle assembly 200, is described. In nozzle assembly 200, sleeve 216 is fixed to adapter 210 and defines a sleeve bore having a narrow downstream portion 211 for locking the retainer features, i.e., latch features 208 and 214, of nozzle body 202 and latch 212, respectively, together in the first position shown in FIG. 5. The sleeve bore also defines a wider upstream portion 213. Latch 212 is configured for movement between the first position shown in FIG. 5, in which the narrow downstream portion 211 of sleeve 216 is engaged outboard of latch feature 214 of latch 212 to prevent disengagement of latch features 208 and 214 of nozzle body 202 and latch 212, and a second position shown in FIG. 6 in which latch 212 is axially retracted relative to sleeve 216 and radially expanded into wider upstream portion 213 of sleeve 216 away from latch feature 208 of nozzle body 202 to allow disengagement of the latch features 208 and 214 of nozzle body 202 and latch 212 for removal of nozzle body 202 from adapter 210.

Figure 7:
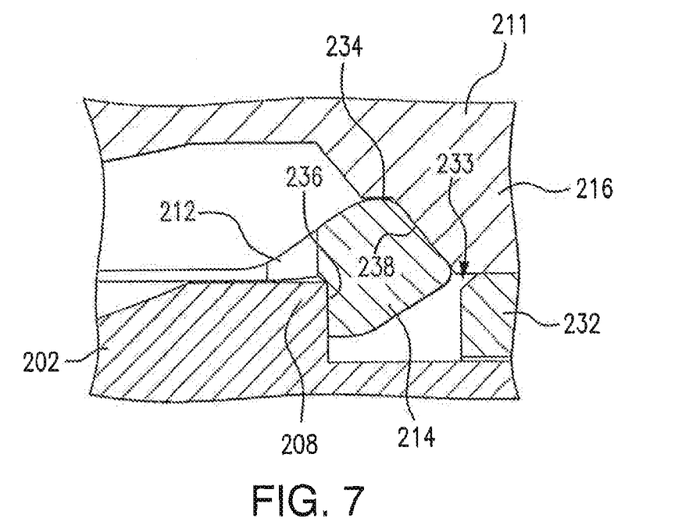
FIG. 7 is a cross-sectional side elevation view of a portion of the nozzle assembly of FIG. 5, showing the engagement of the sleeve, retainer, and nozzle body with the nozzle body locked in place in the adapter.

Release member 232 is engaged with nozzle body 202 between nozzle body 202 and sleeve 216. Release member 232 includes a camming surface 233, identified in FIG. 7, for urging latch feature 214 of latch 212 radially outward in the second position shown in FIG. 6. As shown in FIG. 7, a radial lock surface 234 is defined in the narrow downstream portion 211 of sleeve 216 and in the first position shown in FIG. 5, this prevents latch feature 214 from expanding radially outward and thereby prevents release latch feature 208 of nozzle body 202.

With continued reference to FIG. 7, latch feature 214 of latch 212 includes an abutment surface 236 for abutting against latch feature 208 of nozzle body 202 in the first position shown in FIGS. 5 and 7. Latch feature 214 also includes an abutment surface 238 for abutting against narrow downstream portion 211 of sleeve 216 for compression of latch feature 214 of between the latch or retainer features of nozzle body 202 and sleeve 216, e.g. latch feature 208 and narrow downstream portion 211 respectively, in the first position. Sleeve 216 can be affixed to adapter 210 by any suitable attachment, such as threads.

In the first position shown in FIG. 5, release member 232 can be moved axially relative to sleeve 216. This forces nozzle body 202 and latch 212 to move axially until latch feature 214 begins to clear the lock surface 234 shown in FIG. 7. Latch 212 and nozzle body 202 can move axially into sliding gaps 238, shown in FIG. 5, until they bottom out on adapter 210. Latch 212 eventually bottoms out axially against adapter 210 and as release member 232 continues to move axially, camming surface 233, shown in FIG. 7, urges latch feature 214 radially outward into wider upstream portion 213 of sleeve 216. At this point as release member 232 continues to move axially, latch feature 214 expands radially outward as it continues to be forced by release member 232 moving axially within the sleeve bore. When latch feature 214 expands into wider upstream portion 213 of sleeve 216, latch feature 214 eventually clears latch feature 208 of nozzle body 202 radially, and nozzle body 202 can be removed from adapter 210.

Figure 8:
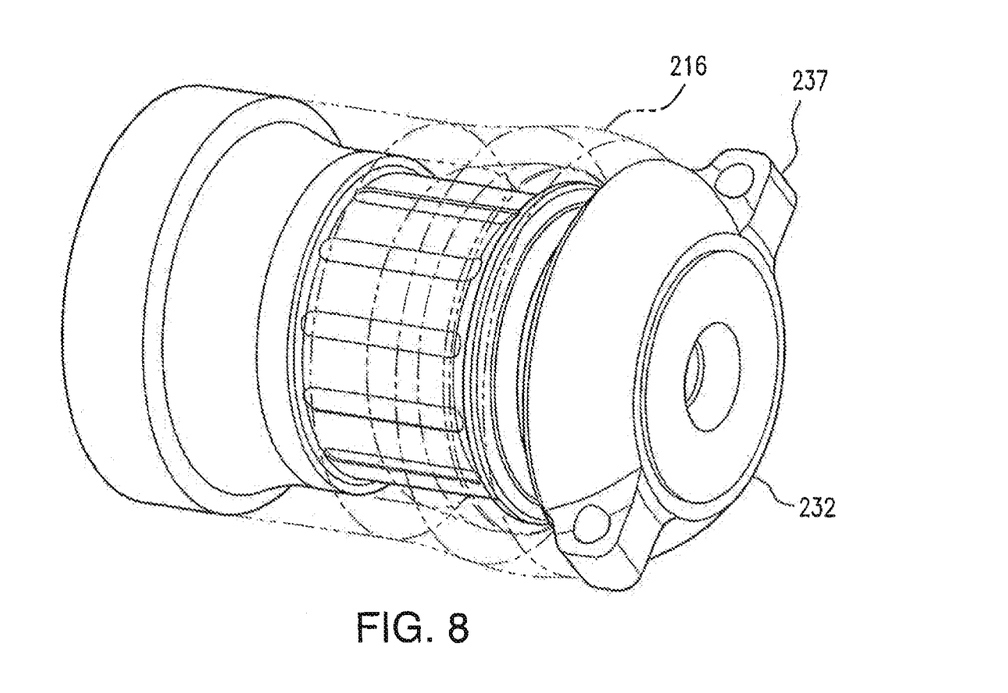
FIG. 8 is a perspective view of the nozzle assembly of FIG. 5, showing the sleeve in phantom to show the retainer.
Figure 9:
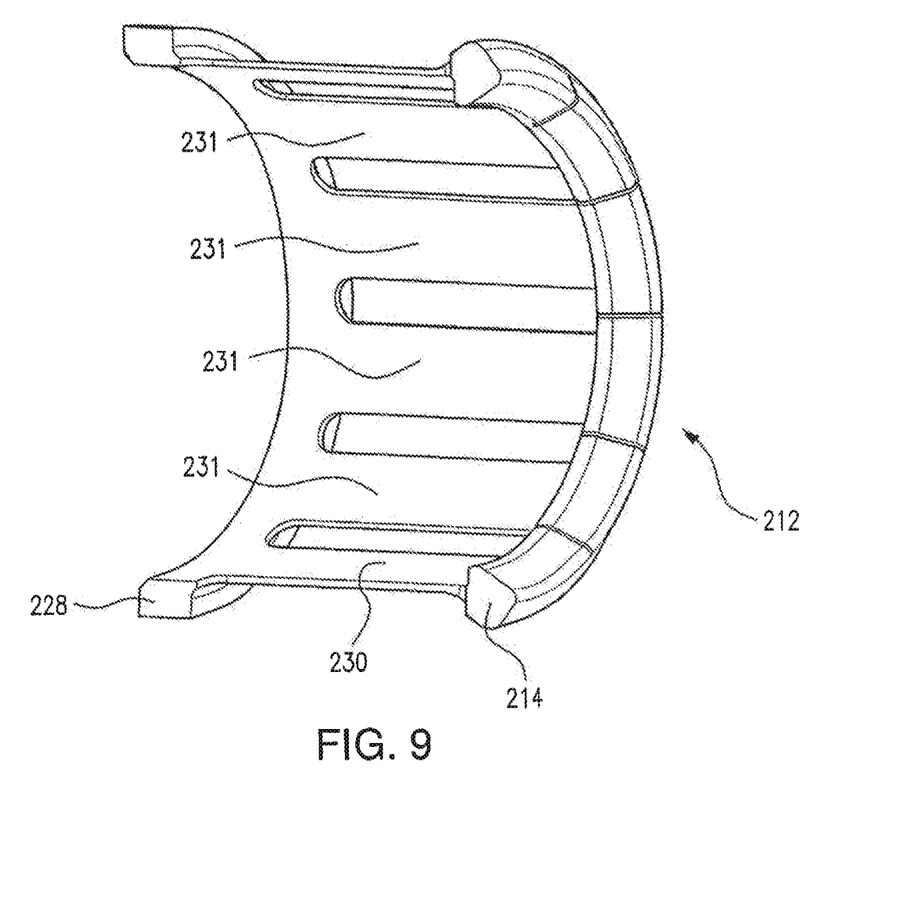
FIG. 9 is a cross-sectional perspective view of the retainer of FIG. 8, showing the flexible fingers connecting between the retainer base and the segmented retainer feature.

As shown in FIG. 8, release member 232 includes grip elements 237 to facilitate gripping release member 232 for removal of nozzle body 202 from adapter 210. The holes in grip elements 236 allow for a safety cable to attached to prevent inadvertent dropping of nozzle components, for example. Referring to FIG. 9, radial expansion of latch feature 214 is similar to that described above with respect to latch 112. Latch 212 includes an annular retainer base, i.e., latch base 228, circumferentially segmented latch feature 214, the retainer segments of which are supported by retainer fingers, i.e., latch fingers 231 much as described above with respect to clasp 112. The thickness of latch feature 214 can be determined by the maximum shearing stress caused in operation by pressure forces acting to compress latch feature 214 between sleeve 216 and nozzle body 202. The thickness of fingers 231 can be determined by the maximum spring stiffness needed. Latch 212 can be machined from a bushing, for example.

Figure 10:
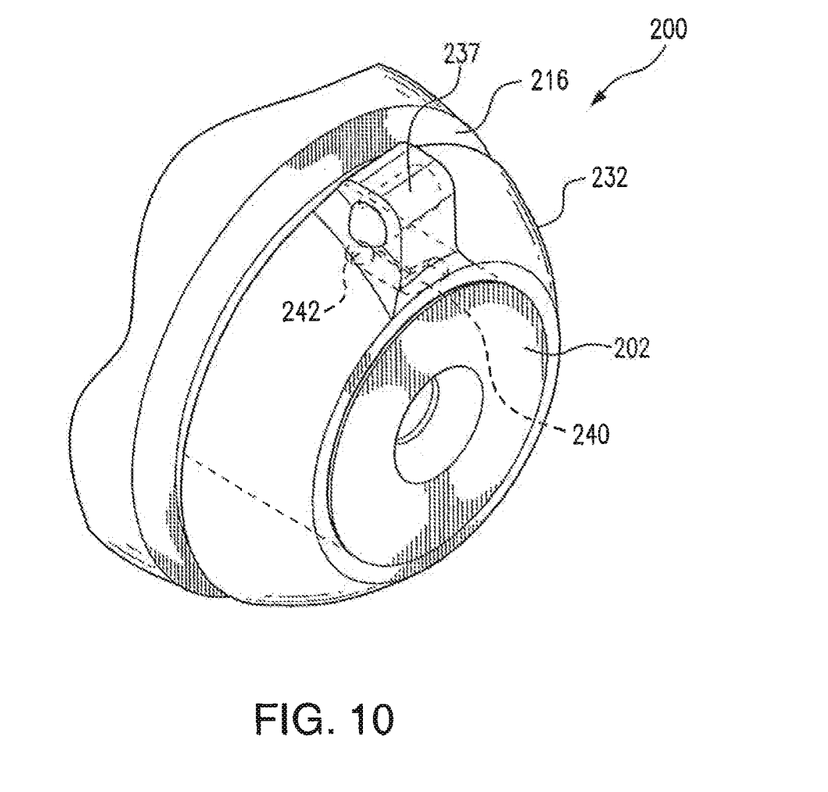
FIG. 10 is a perspective view of a portion of the nozzle assembly of FIG. 5, showing the release member in phantom to show the lock features defined in the release member and nozzle body.

Referring now to FIG. 10, release member 232 and nozzle body 202 have corresponding lock features configured to lock release member 232 in a release position relative to nozzle body 202. In FIG. 10, release member 232 is shown in phantom to show channel 240 defined on the inner surface of release member 232. Channel 240 has a right angle turn and accommodates protrusion 242 of nozzle body 202. As release member 232 moves axially relative to nozzle body 202, the axial portion of channel 240 passes over protrusion 242. When protrusion 242 meets the outlet end of the axial portion of channel 240, release member 232 can be rotated to pass the circumferential portion of channel 240 over protrusion 242. In such a position, relative axial movement of nozzle body 202 and release member 232 is prevented so that nozzle body 202 and release member 232 can be removed together from adapter 210, e.g., buy using grip elements 237. This process can be reversed for placing a new nozzle body into nozzle assembly 202. When engaging a new nozzle body 202 with latch 212, nozzle body 202 can be pressed axially in to adapter 210 until latch 212 clicks over latch feature 208. The clicking can be configured as a feedback so an operator knows the engagement is complete. Hydraulic pressure eventually pushes nozzle body 202 outward to its furthest extend, trapping latch feature 214 radially as shown in FIG. 7. Sliding rubber seals 144 and 244, shown in FIGS. 1 and 5, respectively, prevent leakage between the respective adapters and nozzle bodies.

The systems and methods described above allow for quick, easy removal and replacement of nozzle components, including the possibility of one-handed operation e.g., from atop a ladder, while still being able to handle the high pressures typical of spray drying applications, for example. Removal and replacement can be done without using special tools. As the forces are accommodated axially, possible distortion from traditional tangentially twisting, e.g., of rubber packing components, can be avoided. Hydraulic pressure can be used to assist in the locking of the components. Moreover, nozzle assemblies as described herein can be used to retrofit applications using traditional nozzle assemblies.

Figure 11:
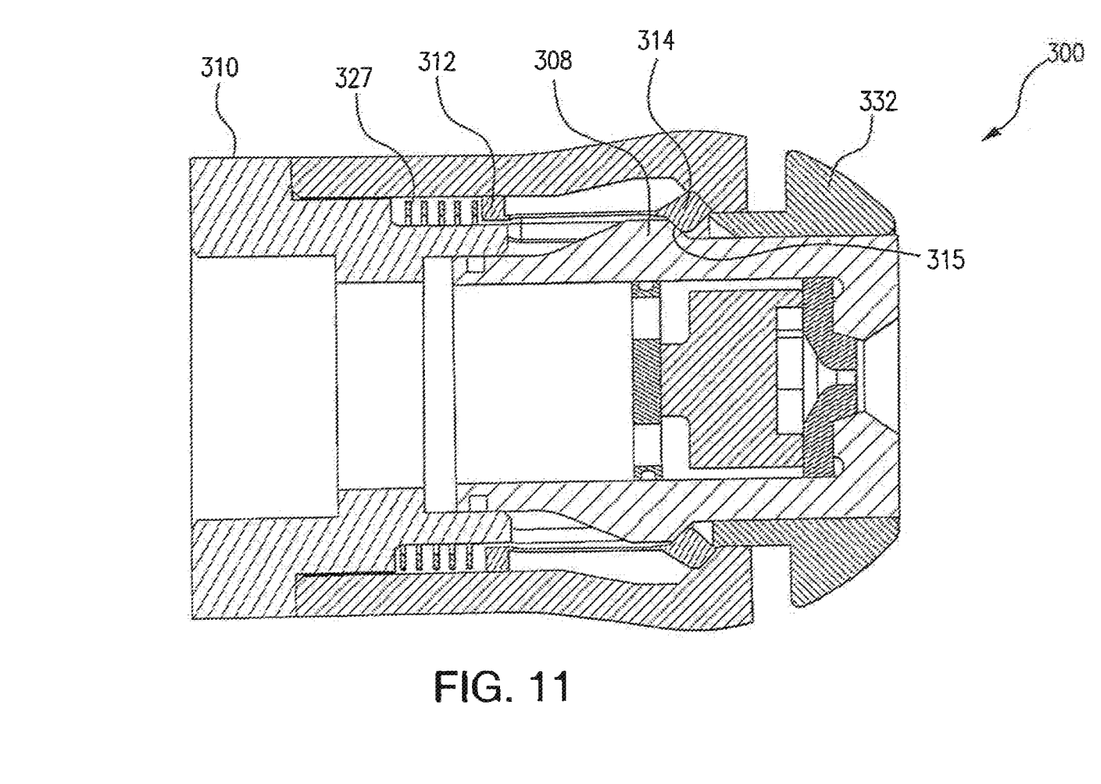
FIG. 11 is a cross-sectional side elevation view of another exemplary embodiment of a nozzle assembly constructed in accordance with the present disclosure, showing a release member and nozzle body having an oblique interface for the releasing position.

With reference now to FIG. 11, another exemplary embodiment is shown, namely nozzle assembly 300, which is similar in many aspects to nozzle assembly 200 described above. Release member 332 and latch feature 308 have mating faces that meet at an interface oblique relative to the longitudinal axis A when nozzle assembly 300 is in the second position (not shown in FIG. 11, but see, e.g., FIG. 6). This configuration facilitates camming action during the release of the nozzle body. As long as latch 312 is unlocked, camming action between latch feature 308 and latch feature 314 will allow the nozzle to be extracted. This also provides an oblique interface 315 between latch feature 308 and latch feature 314 with nozzle assembly 300 in the first position shown in FIG. 11. The added material to latch feature 314 compared to latch feature 214 described above provides increased strength in compression during high pressure operation that locks latch feature 314 in place. A spring 327 is mounted between retainer 312 and adapter 310 to bias retainer 312 axially toward the first position. This helps insure locking of latch feature 314 when installing a new nozzle body.

Figure 12:
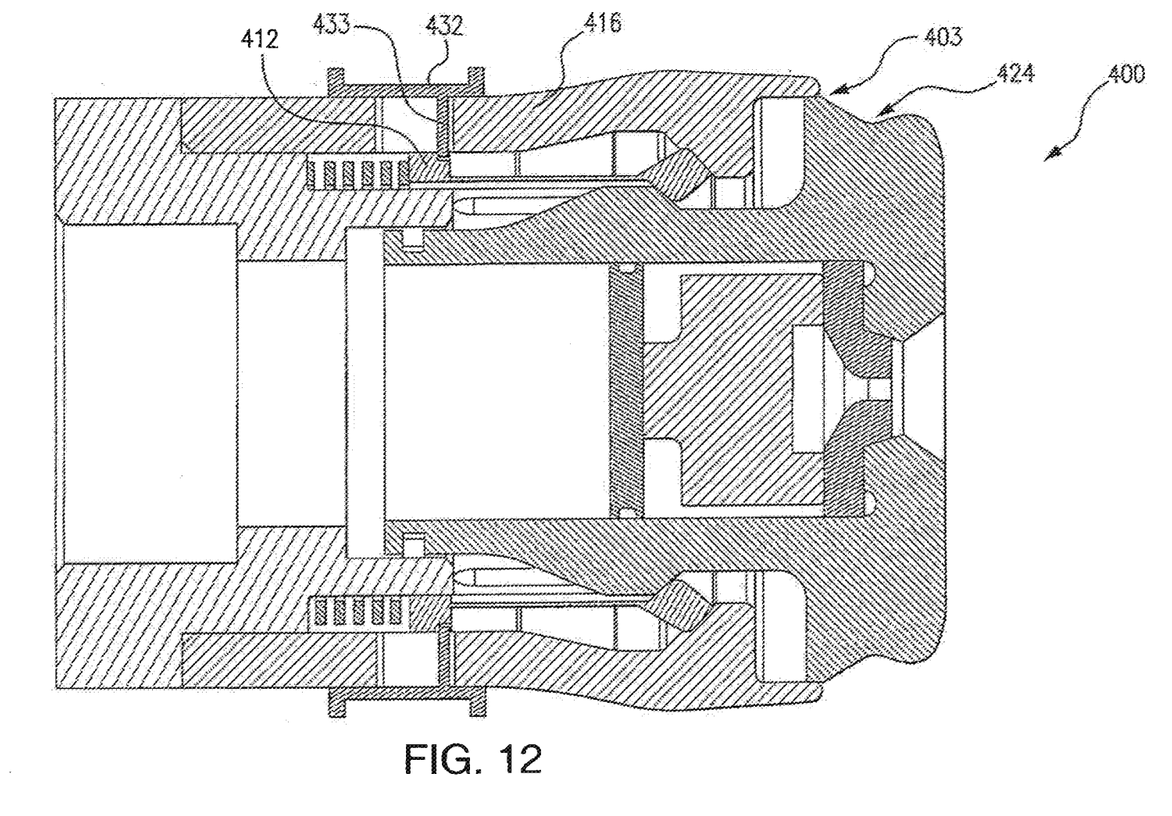
FIG. 12 is a cross-sectional side elevation view of another exemplary embodiment of a nozzle assembly constructed in accordance with the present disclosure, showing an upstream release member and a sealing interface downstream for preventing debris from interfering with the release mechanism.
Figure 13:
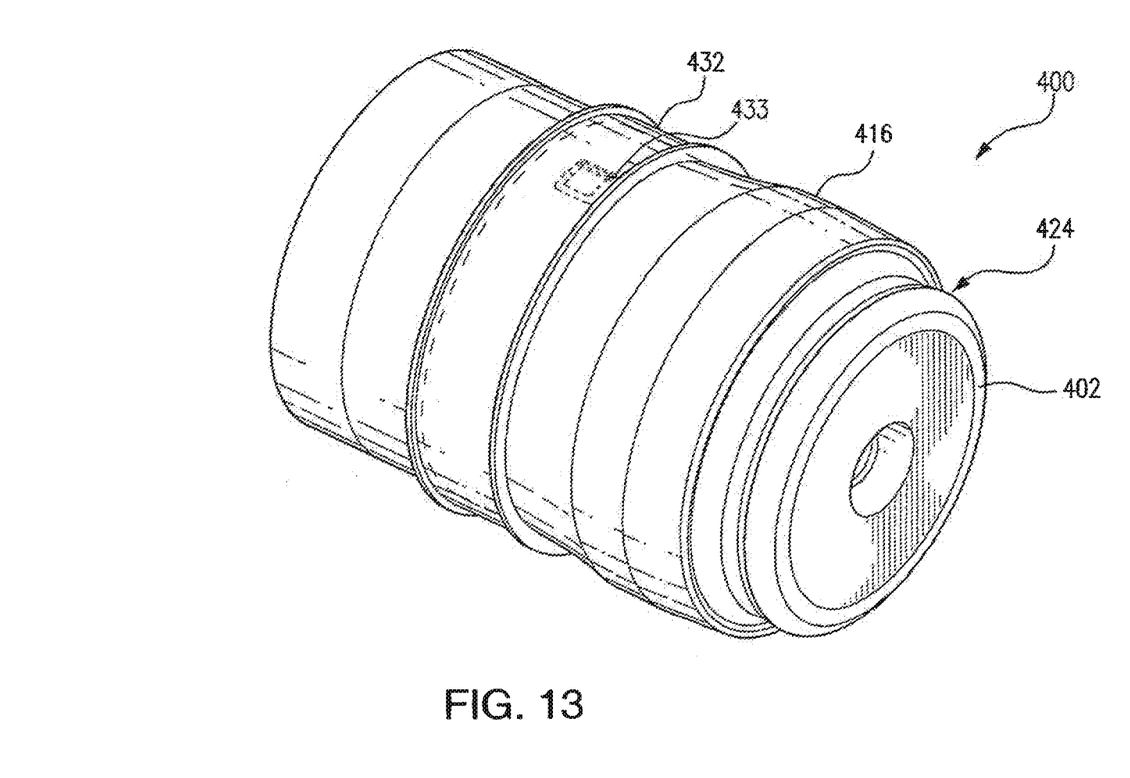
FIG. 13 is a perspective view of the nozzle assembly of FIG. 12, schematically indicating the release member to show the underlying structure.

Referring now to FIG. 12, another exemplary embodiment is shown, namely nozzle assembly 400, which is similar in many aspects to nozzle assembly 300 described above. In nozzle assembly 400, release member 432 is included outboard of sleeve 416. Release member 432 includes pegs 433 that communicate through respective slots in sleeve 416 to connect with latch 412 for actuating latch 412 between the first and second positions. One of the pegs 433 and corresponding slot are shown schematically in FIG. 13. Positioning release member 432 upstream relative to release members 332 and 232 described above allows for downstream portions of the sleeve 416 and nozzle body 402 to be sealingly engaged at a sealing interface 403 to seal the retainer from external debris. This can be advantageous, for example in applications where the product being sprayed tends to grow or accumulate in downstream portions. In such applications, sealing interface 403 will prevent such debris from blocking the release mechanism to facilitate removal of nozzle body 402. Having release member 432 upstream of the nozzle outlet also helps ensure the release mechanism will remain free of clogging debris.

Figure 14:
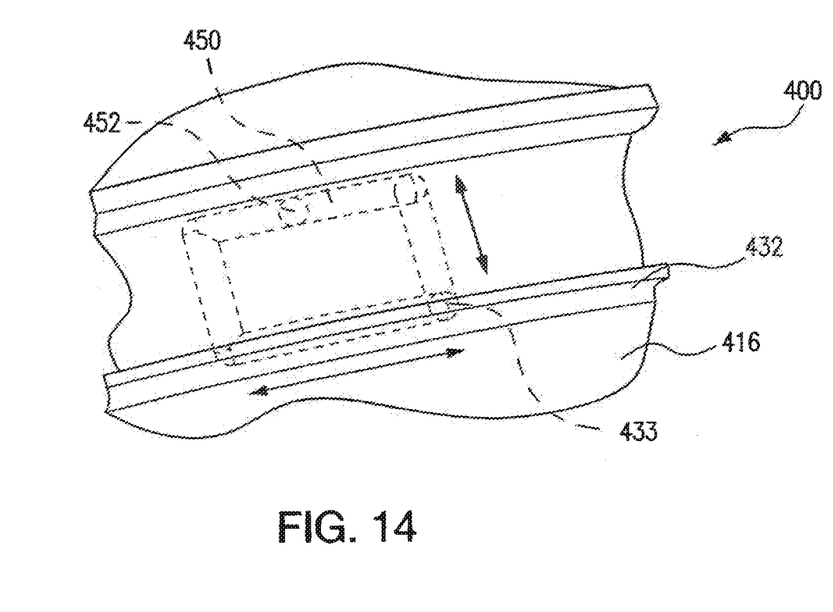
FIG. 14 is a perspective view of a portion of the nozzle assembly of FIG. 12, schematically showing the channel defined in the release member, and the corresponding ball of the sleeve.

A groove 424 in the downstream portion of nozzle body 402 facilitates removal of nozzle body 402, and a bayonet feature, can be used to maintain release member 432 in the release position. To remove nozzle body 402, the nozzle body 402 is pushed inward, release member 432 is moved to the release position and can be locked in place, and nozzle body 402 can be pulled outward, e.g., using groove 424 as a grip. As shown in FIG. 14, to slide release member 432 and pegs 433, release member 432 must first be rotated circumferentially to locate ball 452, which is embedded or affixed to sleeve 416, into the axial portion of c-shaped channel 450, which is defined on the inner surface of release member 432. Peg 433 will then be in the middle of the circumferential portion channel 450 where it started. Release member 432 can then be slid axially, moving pin 433 through the slot in sleeve 416. Then release member 432 can be rotated circumferentially back to lock in the second or release position.

The methods and systems of the present disclosure, as described above and shown in the drawings, provide for nozzle assemblies with superior properties including facilitated removal and replacement. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A nozzle assembly comprising:
    a nozzle body defining an inlet and an opposed spray outlet for producing a spray of fluid supplied at the inlet, wherein the nozzle body includes a radially outward extending retainer feature;
    an adapter having an adapter bore therethrough for supplying fluid to the inlet of the nozzle body, wherein the nozzle body is engaged in fluid communication with the bore of the adapter;
    a retainer radially outward of the adapter and nozzle body and including a retainer feature engaged to the retainer feature of the nozzle body to hold the nozzle body and adapter together; and
    a sleeve engaged to the retainer radially outward thereof to prevent disengagement of the retainer features of the nozzle body and retainer, wherein the sleeve and retainer are configured for relative movement for releasing the retainer features of the nozzle body and retainer for removal of the nozzle body from the adapter;
    wherein the sleeve is configured for movement between a first position in which the sleeve is engaged outboard of the retainer feature of the retainer to prevent disengagement of the retainer features of the nozzle body and retainer, and a second position in which the sleeve is axially retracted from the retainer feature of the retainer to allow disengagement of the retainer features of the nozzle body and retainer for removal of the nozzle body from the adapter;
    wherein the adapter includes a retainer feature engaged with the retainer feature of the nozzle body, and wherein in the first position of the sleeve, the retainer feature of the retainer captures the retainer features of the nozzle body and adapter to prevent disengagement of the nozzle body;
    wherein the retainer feature of the adapter extends radially outward, wherein the retainer features of the nozzle body and adapter abut one another when engaged with the sleeve in the first position, and wherein the retainer feature of the adapter extends radially outward beyond the retainer feature of the nozzle body.

2. A nozzle assembly as recited in claim 1, wherein the retainer features of the nozzle body and adapter abut one another at an interface that is oblique with respect a longitudinal axis defined by the nozzle body.

3. A nozzle assembly as recited in claim 1, wherein a groove is defined on an outlet portion of the nozzle body for gripping of the nozzle body for removal of the nozzle body from the adapter.

4. A nozzle assembly as recited in claim 1, further comprising a sleeve spring engaged to the sleeve to bias the sleeve toward the first position.

5. A nozzle assembly comprising:
    a nozzle body defining an inlet and an opposed spray outlet for producing a spray of fluid supplied at the inlet, wherein the nozzle body includes a radially outward extending retainer feature;
    an adapter having an adapter bore therethrough for supplying fluid to the inlet of the nozzle body, wherein the nozzle body is engaged in fluid communication with the bore of the adapter;
    a retainer radially outward of the adapter and nozzle body and including a retainer feature engaged to the retainer feature of the nozzle body to hold the nozzle body and adapter together; and
    a sleeve engaged to the retainer radially outward thereof to prevent disengagement of the retainer features of the nozzle body and retainer, wherein the sleeve and retainer are configured for relative movement for releasing the retainer features of the nozzle body and retainer for removal of the nozzle body from the adapter;
    wherein the sleeve is configured for movement between a first position in which the sleeve is engaged outboard of the retainer feature of the retainer to prevent disengagement of the retainer features of the nozzle body and retainer, and a second position in which the sleeve is axially retracted from the retainer feature of the retainer to allow disengagement of the retainer features of the nozzle body and retainer for removal of the nozzle body from the adapter;
    wherein the sleeve includes a locking feature configured to lock the sleeve in the first position by twisting the sleeve about a longitudinal axis defined by the nozzle body.

* * * * *